US009596867B2

(12) United States Patent (10) Patent No.: US 9,596,867 B2
Miller (45) Date of Patent: Mar. 21, 2017

(54) MACHINE, METHOD, AND SYSTEM FOR HIGH SPEED CUTTING AND PORTIONING OF EXTRUDED PRODUCTS

(71) Applicant: Risco USA Corporation, South Easton, MA (US)

(72) Inventor: Alan G. Miller, South Easton, MA (US)

(73) Assignee: RISCO USA CORPORATION, South Easton, MA (US)

(*) Notice: Subject to any disclaimer, the term of this patent is extended or adjusted under 35 U.S.C. 154(b) by 0 days.

(21) Appl. No.: 14/823,722

(22) Filed: Aug. 11, 2015

(65) Prior Publication Data

US 2015/0343654 A1 Dec. 3, 2015

Related U.S. Application Data

(62) Division of application No. 13/490,959, filed on Jun. 7, 2012, now Pat. No. 9,107,424.

(60) Provisional application No. 61/494,045, filed on Jun. 7, 2011.

(51) Int. Cl.
*B26D 1/60* (2006.01)
*B26D 7/32* (2006.01)
(Continued)

(52) U.S. Cl.
CPC ............ *A22C 17/0006* (2013.01); *B26D 1/08* (2013.01); *B26D 1/60* (2013.01); *B26D 5/16* (2013.01);
(Continued)

(58) Field of Classification Search
CPC .......... A22C 17/006; B26D 1/60; B26D 1/08; B26G 21/14; Y10T 83/2192; Y10T 83/04; Y10T 83/0515; Y10T 83/4757
(Continued)

(56) References Cited

U.S. PATENT DOCUMENTS 1,924,162 A * 8/1933 Mason ................... B26D 1/605
83/298
2,112,443 A 3/1938 Martoccio
(Continued)

FOREIGN PATENT DOCUMENTS

GB 2027383 A 2/1980
WO WO-0013864 A1 3/2000

OTHER PUBLICATIONS

International Search Report and Written Opinion issued by the European Patent Office as the International Searching Authority for International Application No. PCT/US2012/041282 mailed Nov. 21, 2012 (16 pgs.).

*Primary Examiner* — Ghassem Alie
(74) *Attorney, Agent, or Firm* — Wilmer Cutler Pickering Hale and Dorr LLP

(57) ABSTRACT

An input conveyor, output conveyor, and knife assembly with a blade between the input and output conveyors all reciprocate back and forth as a blade moves perpendicular to the conveyors to cut portioned sized of product, such as ground meat. The cut cycle allows the product feed to keep moving in a continuous manner on conveyors. For ground meat, this system can allow production rates of 150 pieces or more per minute per conveyor line and can improve the accuracy of portioning. The blade is actuated by a profiled cam set that pulls the blade down, and then returns it with a spring to an upper position. The knife assembly can accelerate just after cutting to reduce the potential for sticking to the cut product.

19 Claims, 13 Drawing Sheets

Related U.S. Application Data

(51) Int. Cl.
- *B26D 7/06* (2006.01)
- *A22C 17/00* (2006.01)
- *B26D 1/08* (2006.01)
- *B26D 5/16* (2006.01)
- *B65G 21/14* (2006.01)

(52) U.S. Cl.
CPC ............ *B26D 7/0625* (2013.01); *B65G 21/14* (2013.01); *Y10T 83/04* (2015.04); *Y10T 83/0515* (2015.04); *Y10T 83/2094* (2015.04); *Y10T 83/2192* (2015.04); *Y10T 83/4757* (2015.04)

(58) Field of Classification Search
USPC ..... 83/37, 155, 13, 734, 651, 385, 298, 312, 83/313, 260, 112, 109, 110, 318–320, 73, 83/311, 403.1, 801, 589, 649, 369, 370
See application file for complete search history.

(56) References Cited

U.S. PATENT DOCUMENTS

| | | | |
|---|---|---|---|
| 3,072,004 A * | 1/1963 | Jenkins | B26D 1/605 83/296 |
| 3,128,660 A | 4/1964 | Gaubert | |
| 3,354,765 A * | 11/1967 | Frey | B23D 36/0058 83/318 |
| 3,572,695 A | 3/1971 | Janirek et al. | |
| 3,668,821 A | 6/1972 | Benson et al. | |
| 3,942,411 A * | 3/1976 | Gerber | B23Q 1/032 409/137 |
| 3,975,976 A | 8/1976 | Prentice | |
| 4,030,393 A * | 6/1977 | Steiner | B23D 45/20 83/318 |
| 4,196,645 A * | 4/1980 | Shimizu | B23D 25/04 83/311 |
| 4,962,568 A | 10/1990 | Rudy et al. | |
| 6,032,561 A * | 3/2000 | Lonn | A21C 15/04 83/318 |
| 6,170,369 B1 | 1/2001 | Weinstein et al. | |
| 7,681,630 B2 | 3/2010 | Klassen et al. | |
| 8,833,222 B2 | 9/2014 | Oki et al. | |
| 8,997,614 B2 | 4/2015 | Baechtle et al. | |
| 2008/0028904 A1* | 2/2008 | Arikita | B26D 7/018 83/24 |
| 2009/0238662 A1 | 9/2009 | Duquette | |
| 2015/0033921 A1 | 2/2015 | Finnsson | |

* cited by examiner

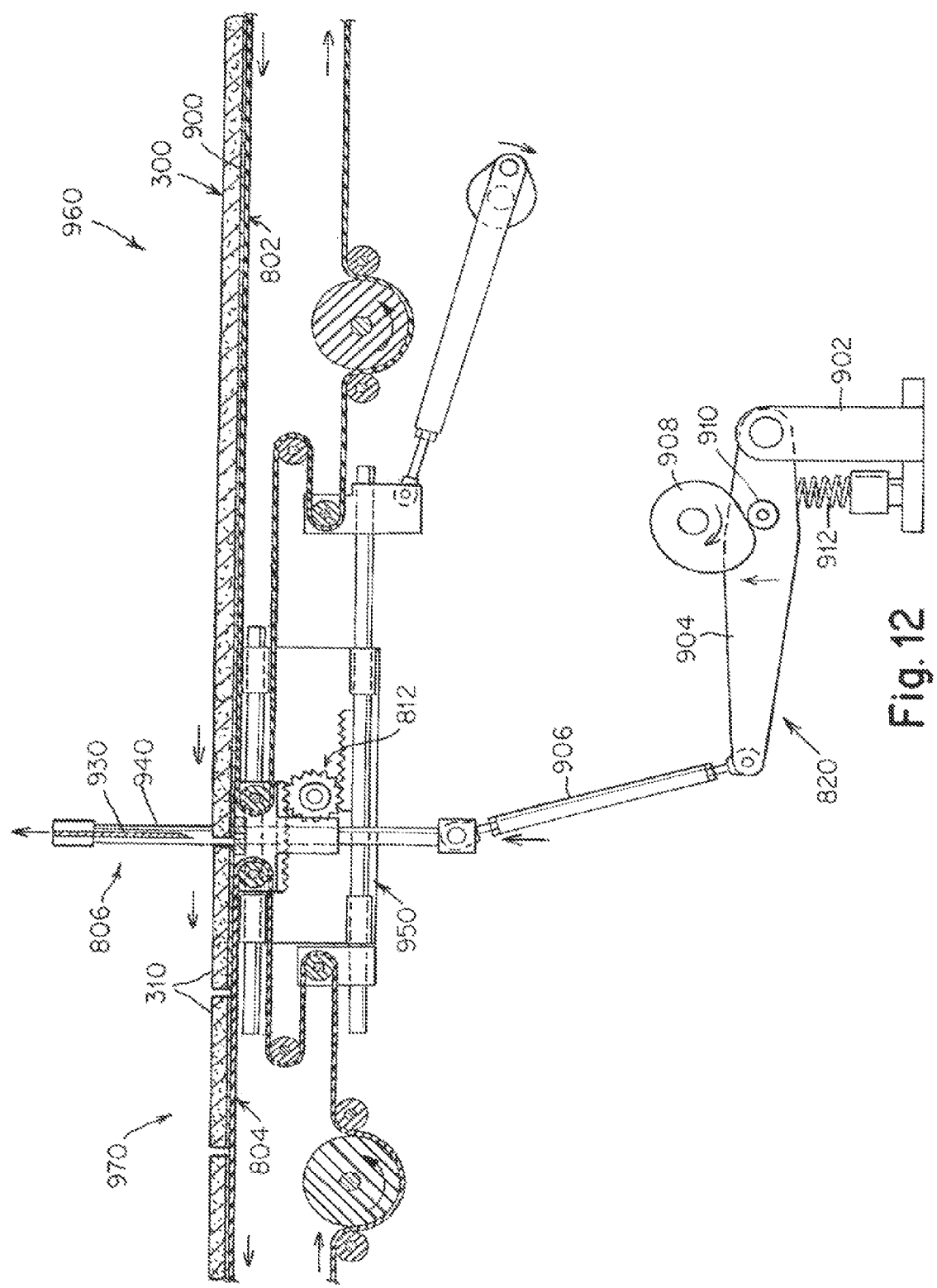

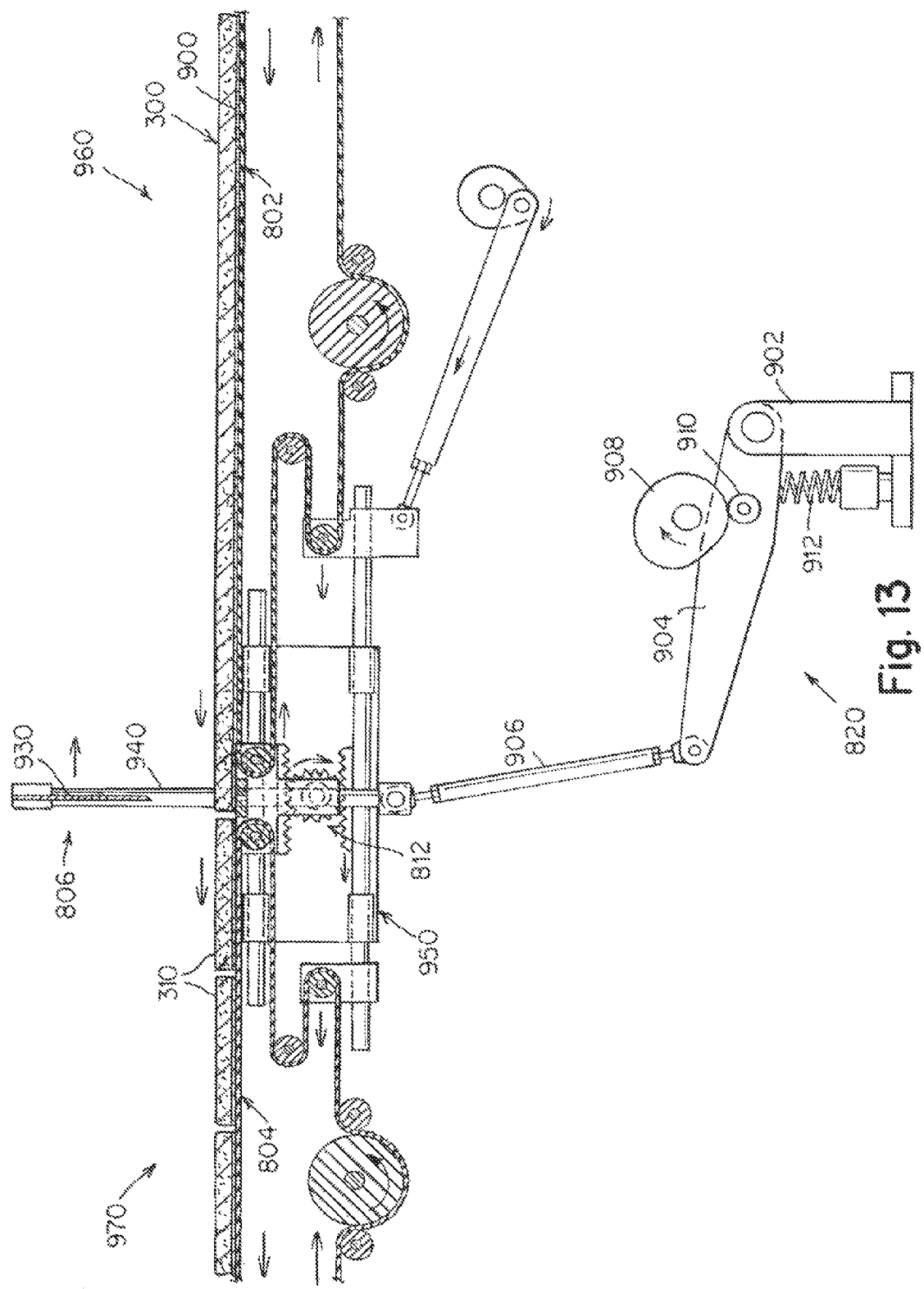

MACHINE, METHOD, AND SYSTEM FOR HIGH SPEED CUTTING AND PORTIONING OF EXTRUDED PRODUCTS

CROSS-REFERENCE TO RELATED APPLICATION

This application is a divisional application of U.S. patent application Ser. No. 13/490,959, entitled "MACHINE AND METHOD FOR HIGH SPEED CUTTING AND PORTIONING OF EXTRUDED PRODUCTS," by Alan Miller, filed on Jun. 7, 2012, to be issued as U.S. Pat. No. 9,107,424, which claims priority under 35 U.S.C. Section 119(e) to U.S. Provisional Application Ser. No. 61/494,045, entitled "MACHINE FOR THE HIGH SPEED CUTTING AND PORTIONING OF EXTRUDED PRODUCTS," by Alan Miller, filed on Jun. 7, 2011, each of which is incorporated herein by reference in its entirety.

FIELD OF THE INVENTION

This disclosure relates to systems and methods for high-speed cutting and portioning of products, such as extruded products.

BACKGROUND

Existing mechanical devices used to cut and portion feed of extruded products include at least two categories of devices. There are devices where the portioning/cutting knife is fixed. When the product is portioned, a feed of material stops and the knife is actuated, cutting through a die to ensure a clean cut/separation of the product to provide a portion. Because the flow of the product is momentarily stopped, production is necessarily limited. For example, devices used to cut, portion and process ground meat typically operate at a maximum speed of about 120 pieces per minute. Rapid starting and stopping in these intermittently operating systems can result in excessive wear and high maintenance. The starts and stops can also lead to fluctuations in the weight and/or shape of the cut product, as systems that use a product pump (i.e., meat pump) have pressure build up during a stop period and release when the belt is restarted. The knives of such systems are typically actuated by pneumatic cylinders, servo drives, or hydraulics, making the system complicated and expensive.

There are also devices where the knife moves with the product and cuts on the fly, enabling the product flow to run uninterrupted. In such cases, the blade of the knife travels down to the transporting belt. This process can result in the product portion not being cut and separated cleanly.

SUMMARY

The systems disclosed herein provide a knife assembly for cutting product on a continuously moving conveyor system. The knife assembly is reciprocated during a cutting cycle that includes a forward movement that moves with the product flow, a cut, and then a return movement. The blade of the knife passes through a die when the cut is made. The die is provided between input and output conveyors that can each operate continuously while the cutting process is performed. The conveyors have a set of rollers that are designed and configured to allow the length of the conveyors to be shortened and lengthened along with the knife assembly as the knife assembly reciprocates, by alternately providing and taking up slack in the conveyors.

The cut cycle allows the product feed to keep moving in a continuous manner on conveyors. For ground meat, this system can allow production rates of 150 pieces or more per minute per conveyor line and can improve the accuracy of portioning. The feed belts and knife assembly can be servo driven for accurate control, while the blade of the knife is actuated by a profiled cam set that pulls the blade down, and then returned by progressive springs. The same cam is used to ensure that the knife is fully up on the reset cycle. The knife assembly can additionally be accelerated forward just after the cutting to reduce the potential for the knife blade sticking to the cut product.

These systems can increase production speed and accuracy while reducing operational cost and maintenance. The systems disclosed herein can thus allow the extruded product, such as ground meat to move continuously, without stopping to cut. Further, the systems disclosed herein also allow for a product pump to run slower, thereby improving product quality, reducing the speed of the mechanical actions and the resulting wear and fatigue on the component parts, while still increasing the productivity of the system. The system also allows a die to be used to get a complete cut, including a cut through paper or some other backing along with the product.

BRIEF DESCRIPTION OF THE DRAWINGS

FIGS. 8-13 are perspective and side views illustrating an additional embodiment of the systems disclosed herein.

DETAILED DESCRIPTION

Overview (FIGS. 3-7)

FIGS. 3-7 are perspective views that illustrate the operation of embodiments of the systems disclosed herein for cutting and portioning a product, such as ground meat, that is extruded and provided on a conveyor, and potentially at high speed and in a continuous manner. The product will often be referred to as meat or ground meat, but other product could be used, such as dough.

Figure 3:
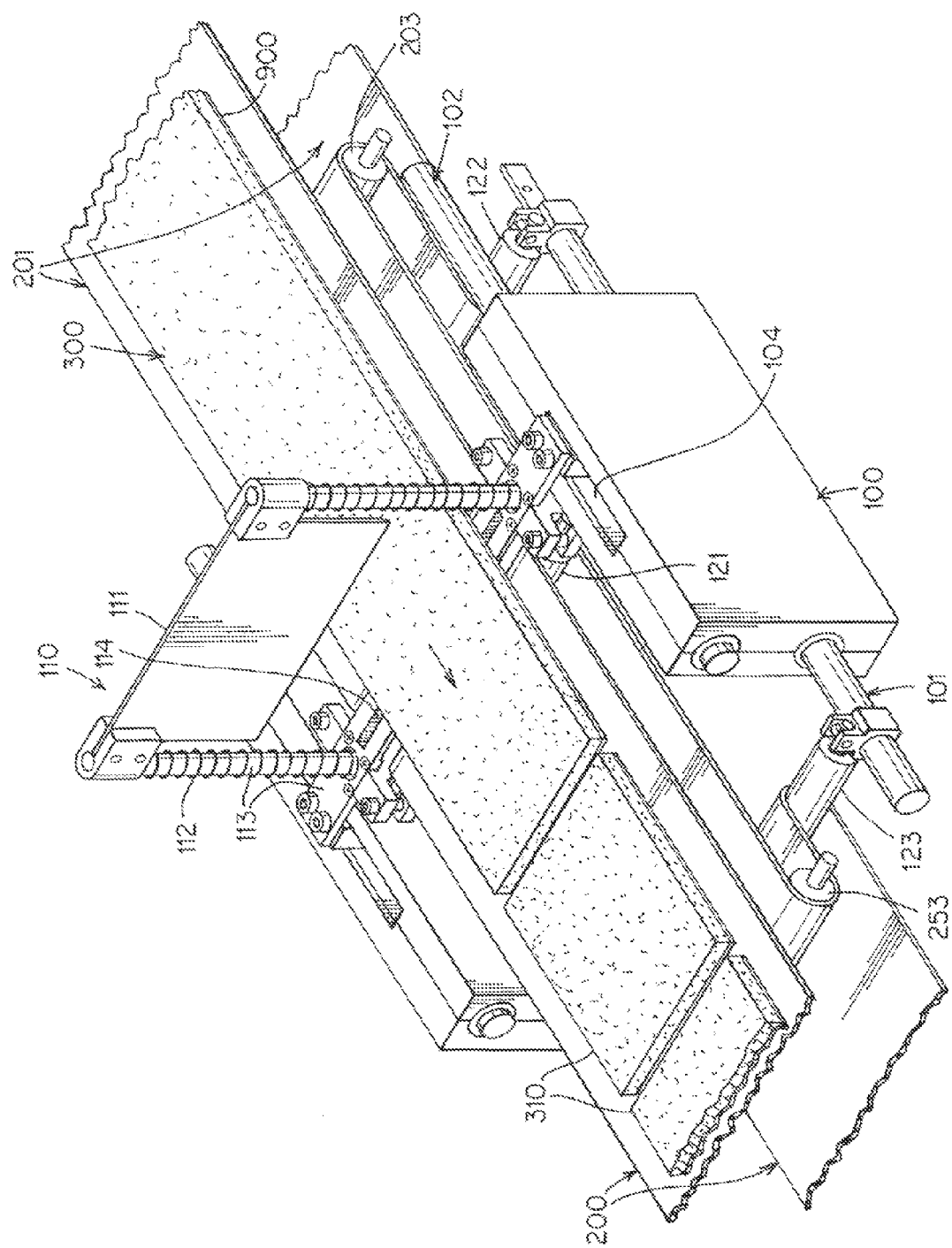
FIGS. 3-7 are perspective views of an illustrative embodiment of the systems disclosed herein in operation, shown cutting and portioning ground meat product.

Referring to FIG. 3, an in-feed belt 201 moves product 300, such as ground meat, with or without a paper backing 900. The product passes a knife assembly 110 with a blade 111 that is actuated by a reciprocating gearbox 100 and a cam system to cut the ground meat and paper to produce portioned product 310 on cut sheets of paper. The cut product is conveyed away on an output belt 200. A die 114 between belt 201 and belt 200 allows the knife to pass through the ground meat and the paper under the meat to make a clean cut.

FIG. 3 shows knife assembly 110 in a fully upward position, disposed most proximate to the product feed source side of the system (i.e., to the right). The conveyors moves from right to left in the figure, from a feed side to an output side. As shown in more detail in FIGS. 1 and 2, the blade is moved up and down with a cam, while the knife assembly is reciprocated with a rack and pinion gearing system with upper and lower racks.

Figure 4:
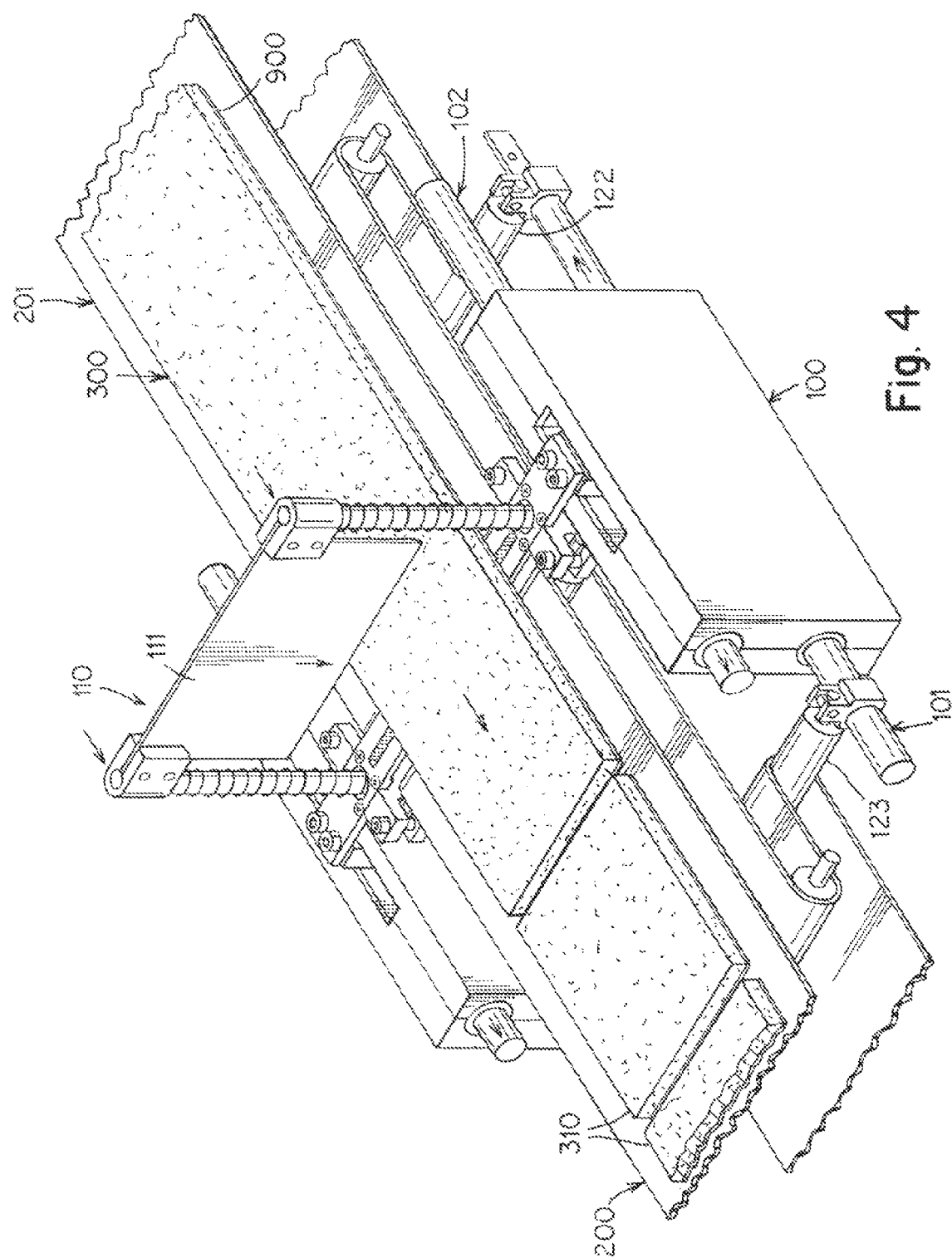

In FIG. 4, blade 111 is starting to move downwardly while the knife assembly with the die 114 is moving forward from the product feed source side of the system to the cut side (right-to-left) at approximately the speed of the product feed itself.

Figure 5:
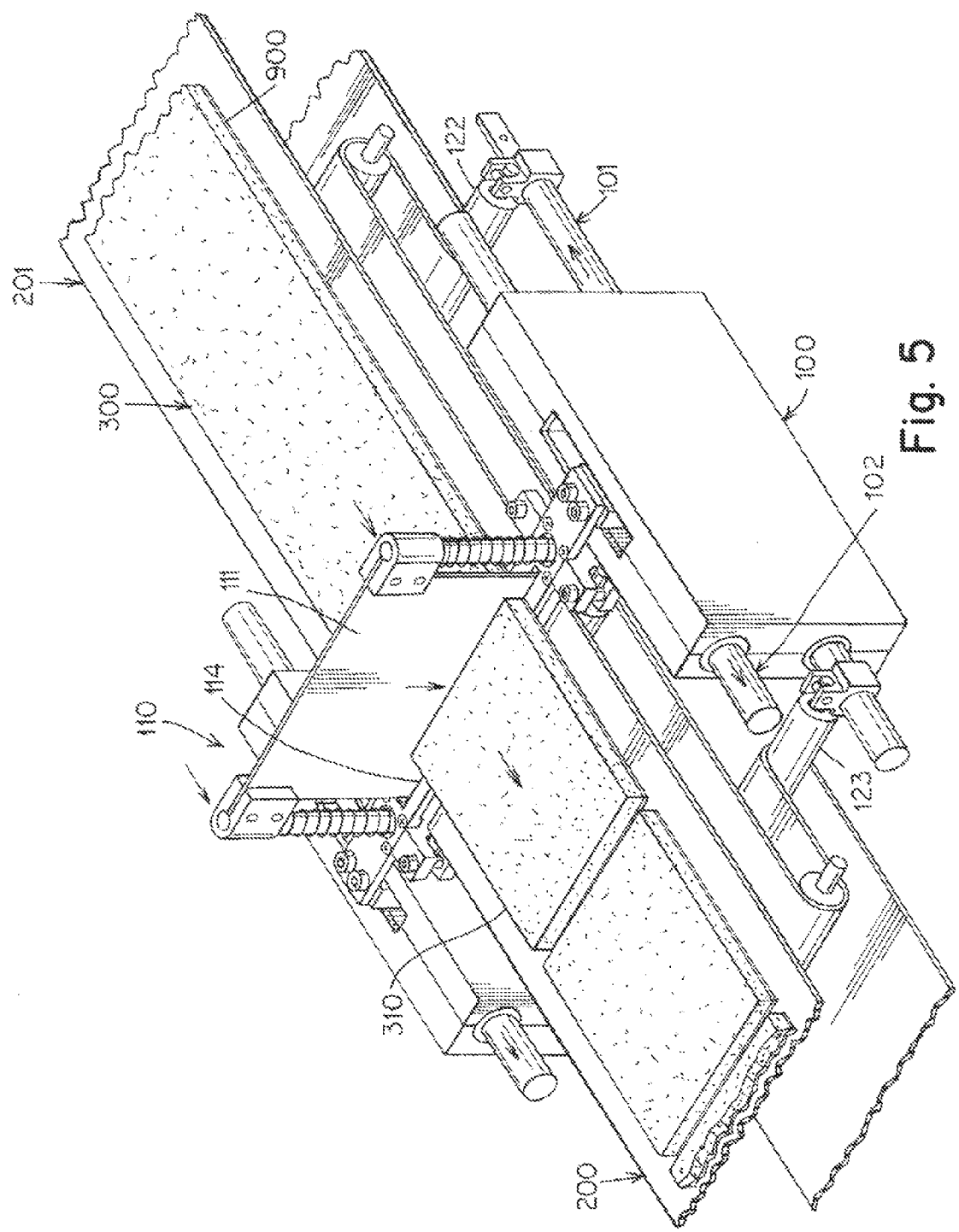

FIG. 5 shows blade 111 in the fully cut position, extending through die 114 between belts 200 and 201 before the cam 220 (FIG. 2) and a spring set 112 begin to return blade 111 to its fully up position. The cam and forward speed control can be designed such that, at this point, the knife assembly accelerates forward and away from the last cut product to help reduce the possibility of the knife blade sticking to the cut product.

Figure 6:
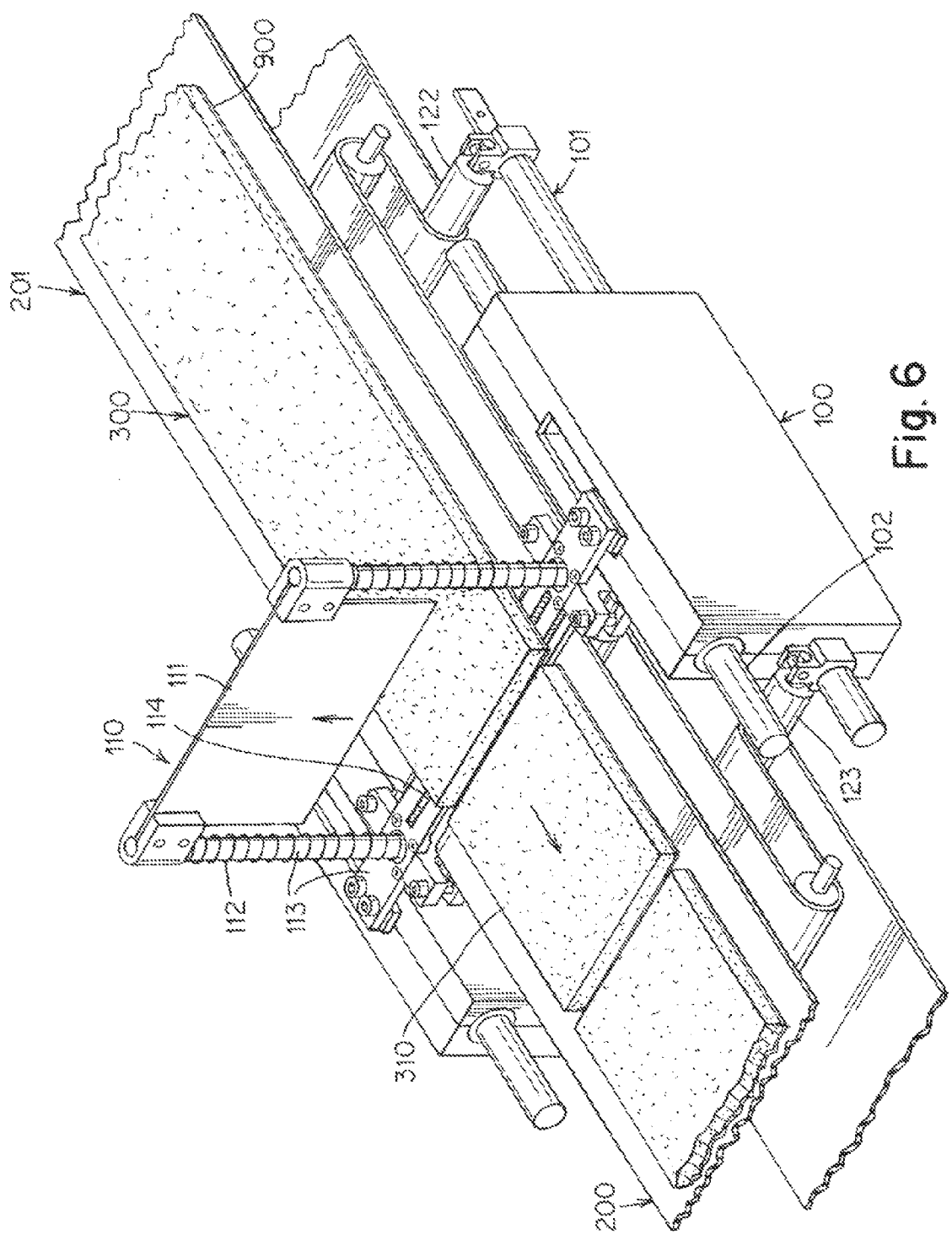

In FIG. 6, knife assembly 111 has returned to its upper position, and the knife assembly is at its farthest point to the output side, from where it will move back toward the feed side. With regard to crank 230 (FIG. 2), the forward and backward motions are each 180 degrees of the crank rotation. In the forward direction, the downward motion of the knife takes place ion the first 120 degrees, while the upward motion takes place in the remaining 60 degrees.

Figure 7:
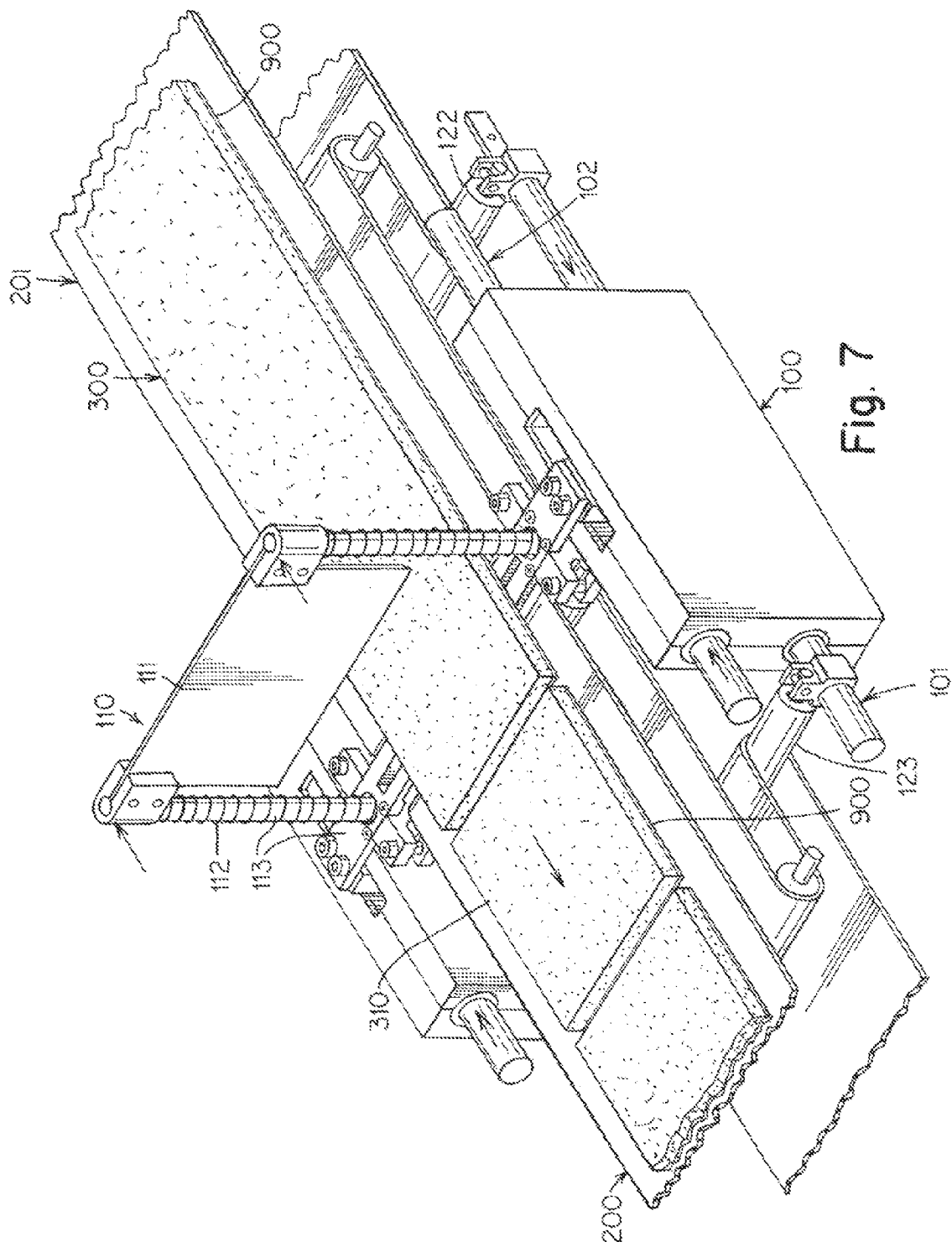

FIG. 7 shows knife assembly 111 at its uppermost position, while the knife assembly is returning to its rightmost position most proximate to the product feed source. When it reaches that position, it will return to the configuration of FIG. 3. The speed of the return with respect to the feed belt provides portion length and thus weight for the cut product.

Figure 1:
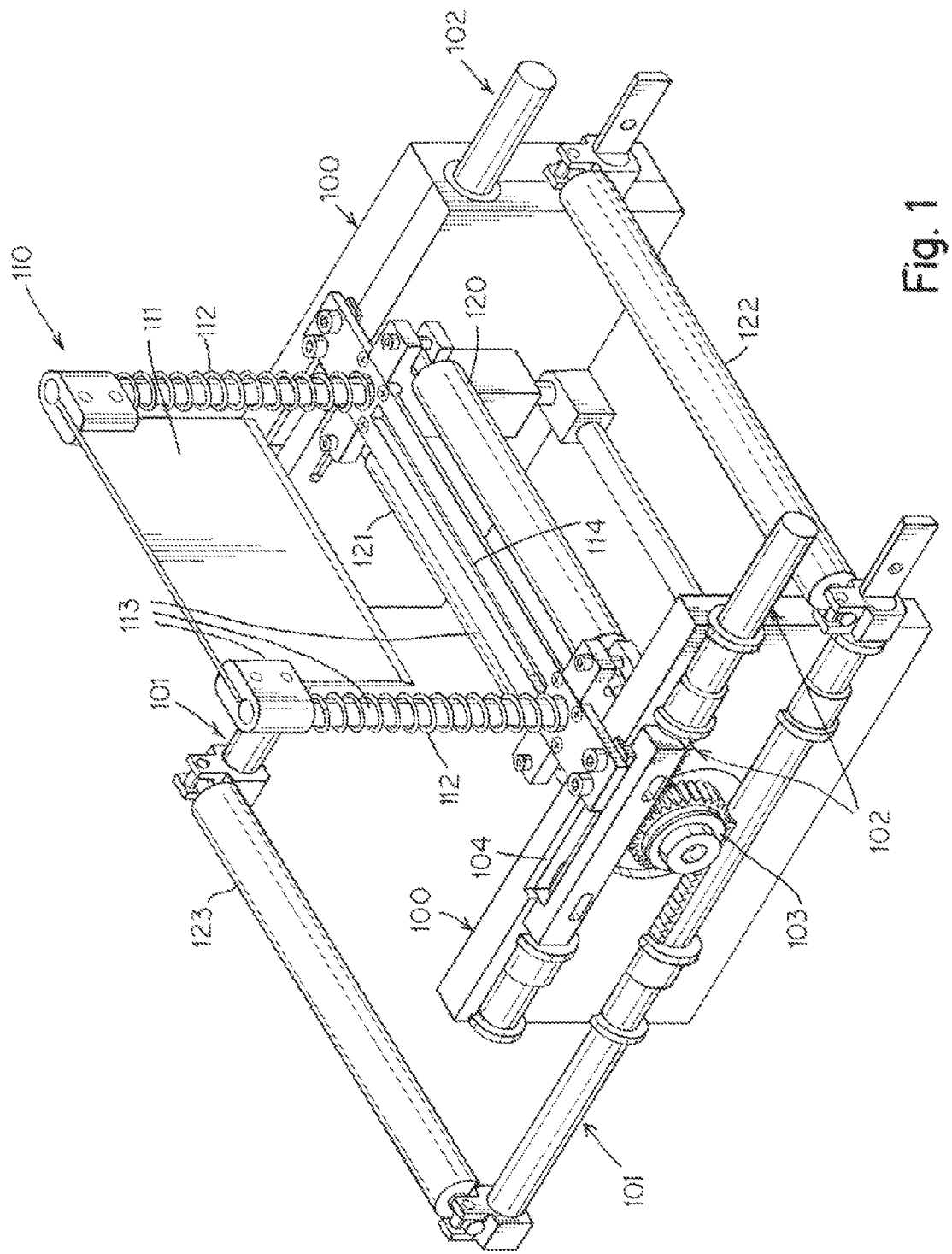
FIG. 1 is a perspective schematic view of an embodiment of the systems disclosed herein.
Figure 2:
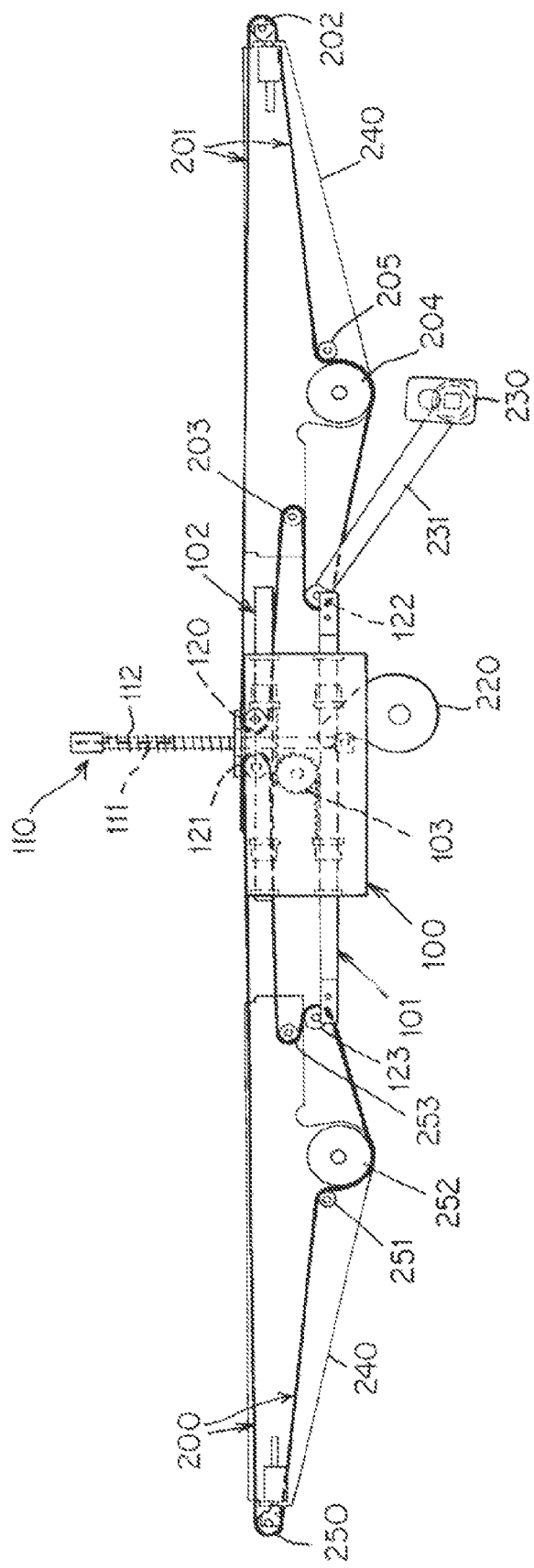
FIG. 2 is a side schematic view of other aspects of the embodiment of FIG. 1.

More Detailed View of Mechanism (FIGS. 1-2)

FIGS. 1 and 2 provide more detailed views of the gearbox and cam, and also the conveyors and rollers. FIG. 1 shows a perspective view of the knife and gearbox construction in an exemplary embodiment of the systems disclosed herein, where a knife assembly 110, including knife support 113, spring set 112, knife blade 111 (which sometimes may be referred to as the knife), and die 114, is mounted on reciprocating gearboxes 100. FIG. 1 shows a proximal gearbox 100 in an open view, revealing lower rack 101 and upper rack 102 with a pinion 103 between them. FIG. 1 also shows an aperture 104 in gearbox 100 which allows knife assembly 110 to freely move back and forth during the reciprocation cycle. FIG. 1 additionally shows first upper front roller 120 and second upper front roller 121 attached to knife assembly 110, and first lower front roller 122 and second lower front roller 123 coupled to lower rack 101. These rollers are mounted to allow them to rotate. The conveyors are omitted from this figure for easier viewing.

Reciprocating Gearboxes

As shown in FIG. 1, embodiments of the systems disclosed herein include a pair of reciprocating gearboxes operated in tandem. Each reciprocating gearbox includes two opposing racks set above and below a pinion (gear). When either the upper or lower rack is actuated to move laterally, the gearbox causes the opposing rack to be moved in the opposite direction. This motion allows the knife assembly to be reciprocated away from and towards the product feed source in, and opposite to, the direction of product flow in response to a simple crank mechanism rotation. In some embodiments, the crank mechanism actuates the lower rack. In other embodiments, the crank mechanism actuates the upper rack. The crank mechanism can include a crank rod. This movement can be obtained using a combination of cams and timing belts. The knife assembly of the disclosed system thus moves substantially parallel with the product flow, as the product flow is transported through the cutting zone.

The reciprocating gearboxes further include a gearbox motor (not shown), that drives a main crank 230, coupled to a crank rod 231 (FIG. 2), which in turn pushes the lower rack 122 of each reciprocating gearbox to be motored away and towards the product feed source at a set distance. In response, the upper rack is moved in the opposite direction. This drive also rotates the knife cam 220 (FIG. 2). In some embodiments, a single gearbox motor drives both gearboxes. In further embodiments, each gearbox is driven by a separate gearbox motor. The gearbox motor can also rotate the knife cam so that the rack movement is followed accurately by the knife cam, ensuring correct operation and synchronization.

While the crank 230 turns and the knife assembly moves away from the product feed source, the cam rotates and pulls the knife down and through the die 114, providing the cutting action on the product. As the full forward position is reached by the reciprocating gearbox (i.e. the point furthest away from the product feed source), the cam clears the knife and it returns to the full up position assisted by the spring set. The cam at this point again makes contact with the knife to ensure it is in the fully up position before it starts the return portion of the cycle.

Knife Assembly

The embodiments of the systems disclosed herein also include a knife assembly. In some embodiments, the knife assembly is mounted on the upper rack of the gearboxes. As the gearboxes are reciprocated from the drive crank, the assembly moves in a reciprocating manner away from and towards the product feed source and parallel to the feed flow. In some embodiments, the knife is mounted on the support and operated by a cam set situated below the knife assembly. In these embodiments, the knife is actuated down as the knife assembly is moving away from the product feed source at about the same speed as the product flow. This results in portion cutting on the fly without the need to stop or slow the product flow.

Knife and Knife Cams

The systems disclosed herein further include a knife blade mounted to the knife assembly, and held in the up position by a set of springs that provide or help provide a progressive return when the knife is released from the down position. In order for the knife to move down through the product flow and cut off a portion of the product, a spiral rotating cam can be used. In some embodiments, the spiral rotating cam is located below the knife in a fixed location and is synchronized with the gearbox crank so that its action is timed with the forward and back movement of the reciprocating gearboxes and knife assembly.

The cam profile not only pulls the knife blade down in order to cut the product flow into a predetermined portion, but also insures that the knife is in the full up position before the knife assembly and knife start to move towards the product feed source. In some embodiments, the knife assembly and knife blade accelerate forward relative to the speed of the product flow after the cut is made to make it easier to remove the blade from the product and to prevent product buildup against the blade as it returns to the up position.

The knife cam pulls the blade down as the knife assembly (which in some embodiments is attached to the upper rack) moves away from the product feed source. The cam releases the knife before the rack changes direction and the knife is pushed back to upper position by a set of springs. The cam then comes back into contact with the knife as the knife assembly returns, ensuring it is in the fully up position.

The spring set in the reciprocating gearbox are sufficiently powered to ensure the blade quickly comes up and clears the product as it moves down the line.

FIG. 2 shows a side-view schematic of an exemplary embodiment of the systems disclosed herein, with a better view of the conveyors and rollers. Knife assembly 110 is shown with a set of springs 112 and is mounted to gearboxes 100 that are operated by a crank 230 and a crank rod 231. Upper rack 102 and lower rack 101 are shown on either side of pinion 103 in gearboxes 100, where spiral rotating cam 220 operates the knife support and blade 111.

An in-feed belt 201 on the right is fed around first fixed rear roller 202, first upper front roller 120, first fixed middle roller 203, first lower front roller 122, first return roller 204 and back to first fixed rear roller 202. An in-feed rod 205 picks up slack from in-feed belt 201. Similarly on the output side shown on the left, an output belt 200 is fed around a second fixed rear roller 250, a second return roller 252, a second lower front roller 123, a second fixed middle roller 253, a second upper front roller 121, and back to second fixed rear roller 250. A lower output feed rod 251 is pictured picking up slack from output belt 200. First and second fixed rear rollers 202 and 250, first and second return rollers 204 and 252, and first and second fixed middle rollers 203 and 253 are affixed to a frame 240. Rollers 120, 122, 121, and 123 are coupled to the rack and pinion.

In-Feed and Output Belts

The in-feed and output belts are co-planar (as shown) and arranged in a back-to-back arrangement so that products can move from the in-feed belt, past the knife assembly, and to the output belt (see also FIGS. 3-7). The in-feed belt brings the product flow to the cutting zone and then the output belt takes away the cut portion of product away from the cutting zone. In some embodiments, the in-feed and output belts comprise upper front rollers fastened to the upper racks of the gearboxes or the knife assembly, and lower front rollers fastened to the lower racks of the gearboxes, respectively, fixed rear rollers at the ends of the belt system, fixed middle rollers disposed between the ends of the belt system and the gearboxes, and fixed return rollers disposed between the middle and rear rollers.

In some embodiments, the in-feed belt feeds around a first fixed rear roller on the in-feed side of the knife assembly, around a first upper front roller on the in-feed side of the knife assembly, around a first fixed middle roller on the in-feed side of the knife assembly, around a first lower front roller on the in-feed side of the knife assembly, around a first return roller on the in-feed side of the knife assembly, and back to the first fixed rear roller.

In some embodiments, the output belt feeds around a second fixed rear roller on the output side of the knife assembly, around a second upper front roller on the output side of the knife assembly, around a second fixed middle roller on the output side of the knife assembly, around a second lower front roller on the output side of the knife assembly, around a second return roller on the output side of the knife assembly, and back to the second fixed rear roller.

The belts, although independently driven, have upper and lower front rollers attached to the upper and lower racks of the reciprocating gearbox. This configuration allows the knife and knife assembly to move away from the product feed source as the first upper front roller moves the in-feed belt with it. The belt length is kept constant by the simultaneous motion of the lower rack and first lower front roller moving in the opposite direction. Similarly, the output belt is moved away from the product feed source as the second upper front roller moves the output belt with it, and the output belt length is kept constant by the simultaneous motion of the lower rack and second lower front roller moving in the opposite direction.

The upper and lower racks of the reciprocating gearboxes move to enable the top of the in-feed and output belts to move with the knife assembly. During the cut cycle, the in-feed belt requires slack as the first upper front roller moves away from the product feed source (right to left as shown in FIG. 2) with the knife assembly, and the first lower front roller moves towards the product feed source (left to right) with the lower rack. This slack is provided by a lower in-feed rod moving towards the product feed source and away from the first return roller, thus freeing a portion of the belt. Simultaneously, the output belt has slack taken up as the second upper front roller moves away from the product feed source with the knife assembly and the second lower front roller moves towards the product feed source with the lower rack. This slack is taken up by a lower output feed rod moving towards the product feed source and towards the second return roller, thus taking up the slack. During the portion of the reciprocation cycle following the cut cycle, these processes are preformed in reverse, where slack is taken up in-feed belt and provided to the output belt. This process enables the belts to be at a fixed position at the product feed source and output ends of the system, while the section of the belts at the knife assembly lengthen and shorten as necessary to keep the product flowing through the cutting zone at a constant speed.

In some embodiments, the belts are driven by a separate drive motor with a variable speed, however the front upper and lower rollers are mounted to the upper and lower racks of the reciprocating gear boxes, respectively. This connection enables the belts to stay in position relative to the knife assembly as it moves away from and towards the product feed source with the belt length being maintained by the lower roller moving in the opposite direction.

In operation, the product can be placed on the in-feed belt at a constant and continuous flow and belts loading and activation of the knife cycle will cut a portion off the flow as it passes through the cutting zone. The time between cuts can be varied to allow a programmable weight or length of the product to be produced. For ground meat, a system could cut patties, or bulk sizes (such as 1, 2, or 5 lbs, or 0.5, 1.0, or 2 kg.).

In some embodiments, the relevant portions of system are manufactured from stainless steel to enable processing of food products and enable easy cleaning In some embodiments, the systems disclosed herein are used as part of a system using other pieces of equipment. In some embodiments, the systems disclosed herein are part of a line comprising a stuffer or pump that extrudes a product in the required form onto the feed belt. This product then moves through the cutting zone where the knife is triggered by length of a portion signal from the pump to cut. This results in a block that is then further processed by feeding into a packaging machine. When all machines are operating under a contiguous mode, high volumes of product can be portioned quickly and accurately for resale.

In some embodiments, the systems disclosed herein are used for food products. In some embodiments, the systems disclosed herein are used for processing, cutting, and portioning meat. In some embodiments, the meat is ground meat. In further embodiments, the systems disclosed herein are used for non-food products that can be cut with a blade or knife, and where a consistent length or weight is required. In some embodiments, the systems disclosed herein are used for paper.

In some embodiments, the systems disclosed herein provide a cut product of a single consistent size. In further embodiments, the systems disclosed herein provide cut products of multiple sizes consistently. In some embodiments, the product is cut in specified widths and lengths.

Additional Embodiment

FIGS. 8-13

FIGS. 8-13 include a perspective view and side views of an embodiment with a rocker arm and spring below the gearbox. This embodiment can help reduce wear on bushings for the motion of the knife. The rack and pinion gearing, conveyors, and rollers for the conveyors are substantially the same as for the embodiment of FIGS. 1 and 2, and the resulting output of portioned product is substantially the same.

Figure 8:
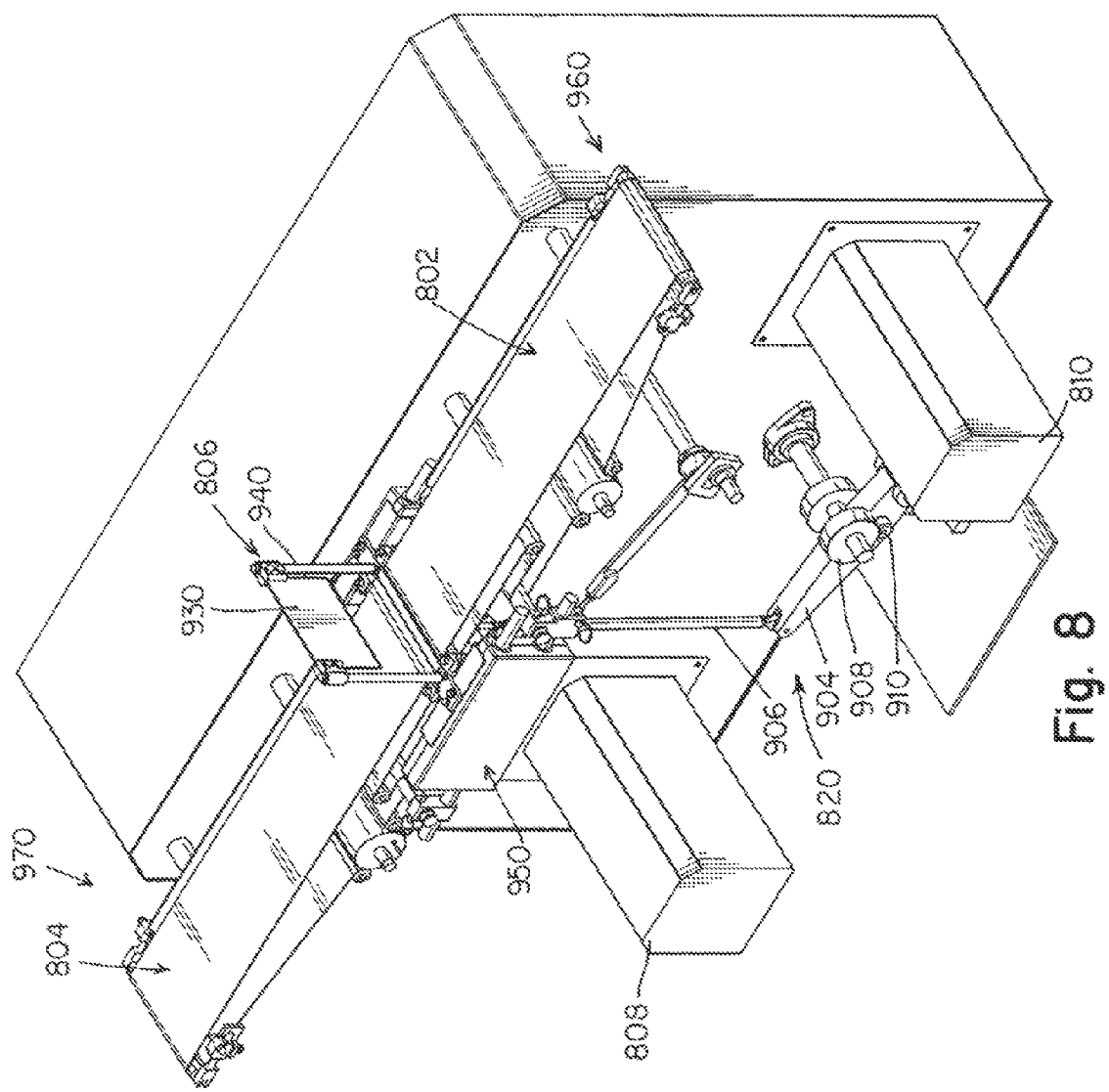

Referring to FIG. 8, an input conveyor 802 provides product from an input source, such as an extruder (not shown), and conveys product to an output conveyor 804 past a knife assembly 806. Operations can be driven with motors with housings 808 and 810. As described above, a rack and pinion assembly 812 can be used to cause the knife assembly 806 to move in a reciprocating manner; and each of conveyors 802 and 804 is mounted to a set of rollers that provide and take up slack as needed as the knife assembly reciprocates. Unlike the embodiment of FIG. 2 where the cam is located near the rack and pinion, and springs are next to the blade, this embodiment includes a rocker arm assembly 820 with cam and spring below the conveyor.

Figure 9:
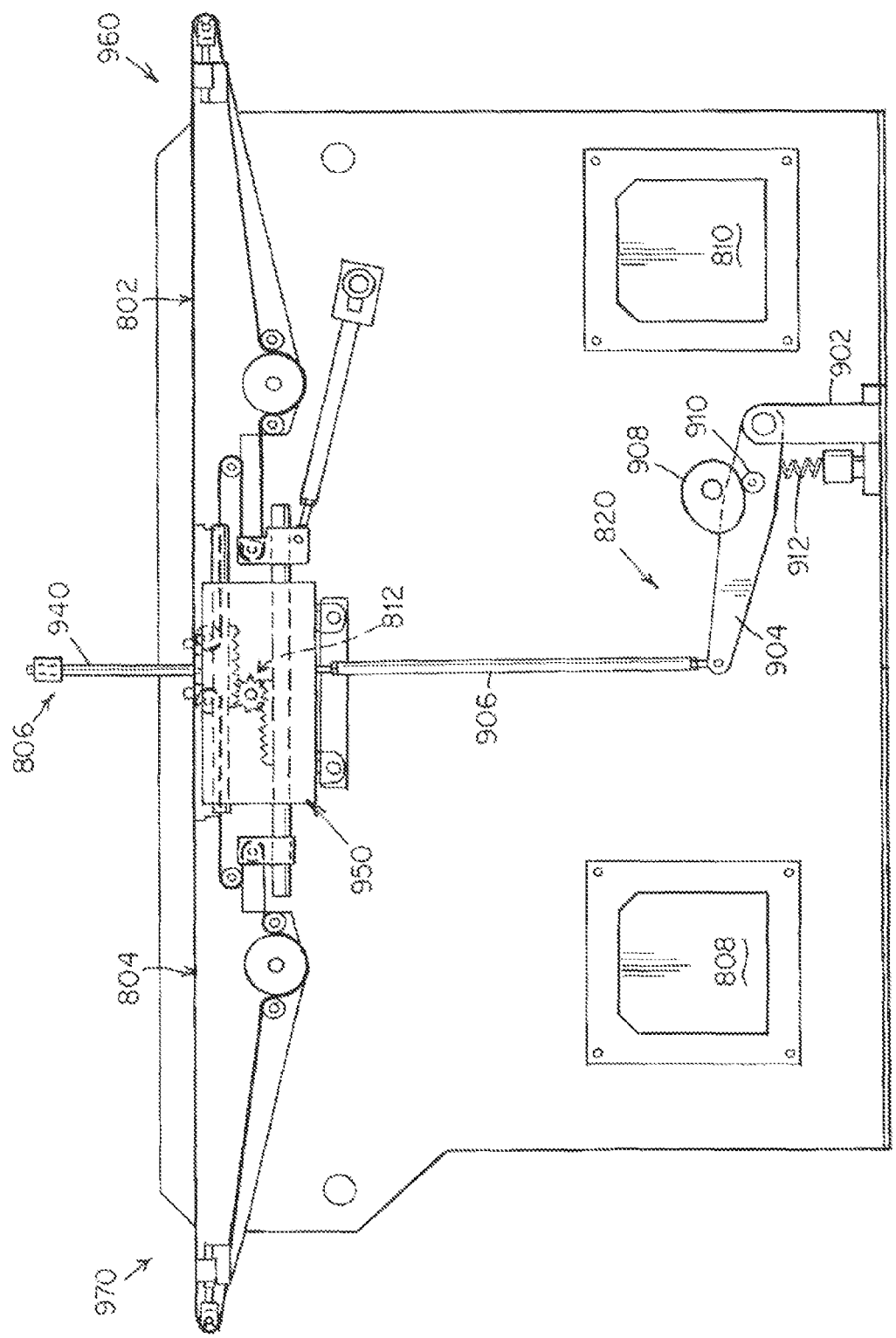

Referring also to FIG. 9, rocker assembly 820 includes a fixed stationary support 902, a support arm 904 pivotally connected to support 902, a rod 906 pivotally connected to support arm 904 and also coupled to knife assembly 806, a cam 908, a follower 910 coupled to arm 904 and engaging cam 908, and a spring 912 coupled to a stationary floor and to support arm 904.

Figure 10:
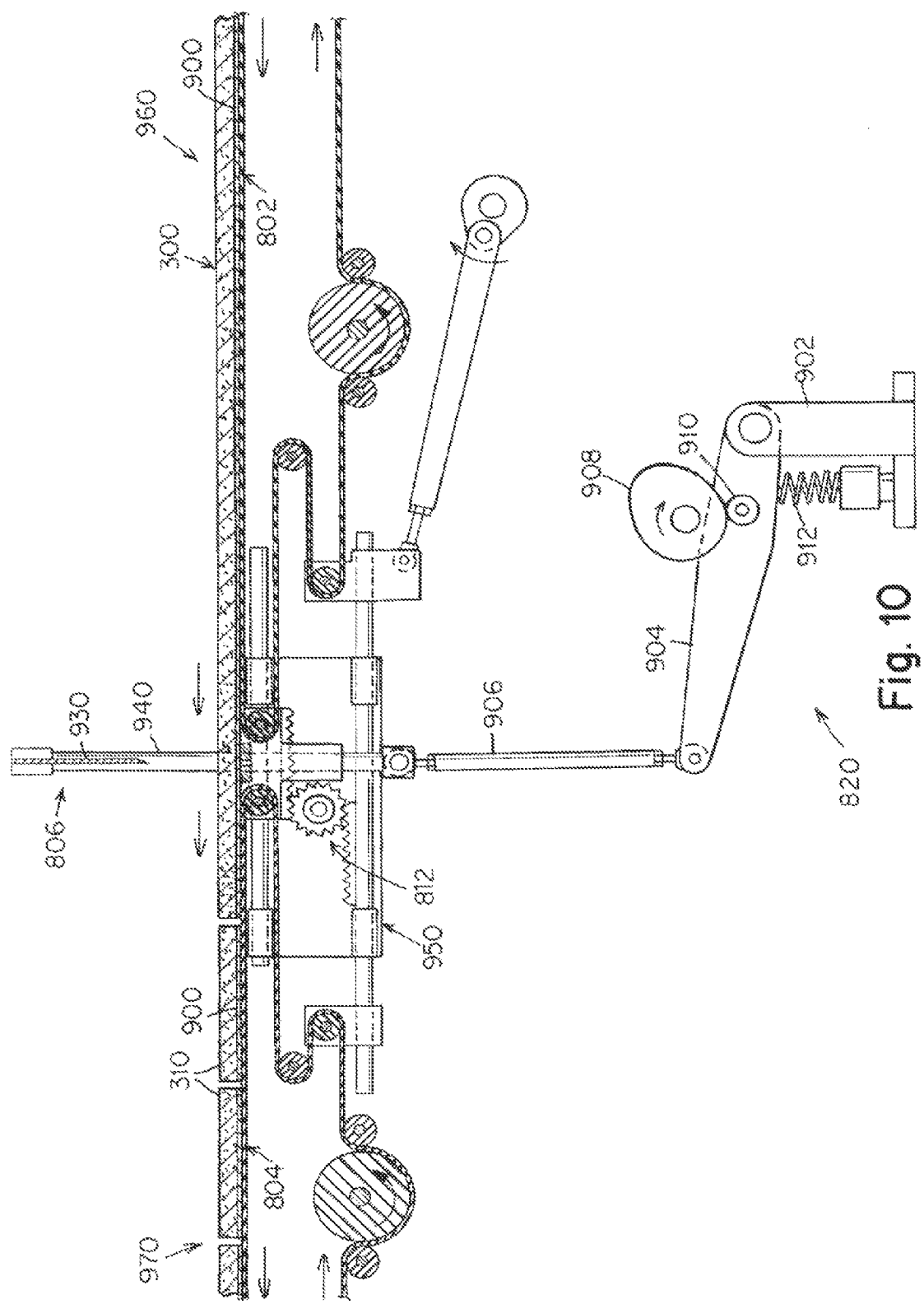

FIGS. 10-13 illustrate operation with housing parts removed from view for convenience. Arrows indicate the movements of the rollers, but because they are similar to those shown and described above, a description is not repeated here in detail. In FIG. 10, blade 930 and its support 940 are in an upper position and getting ready to cut. The knife assembly is at the right-most (feed) end and is about to move forward (left).

Figure 11:
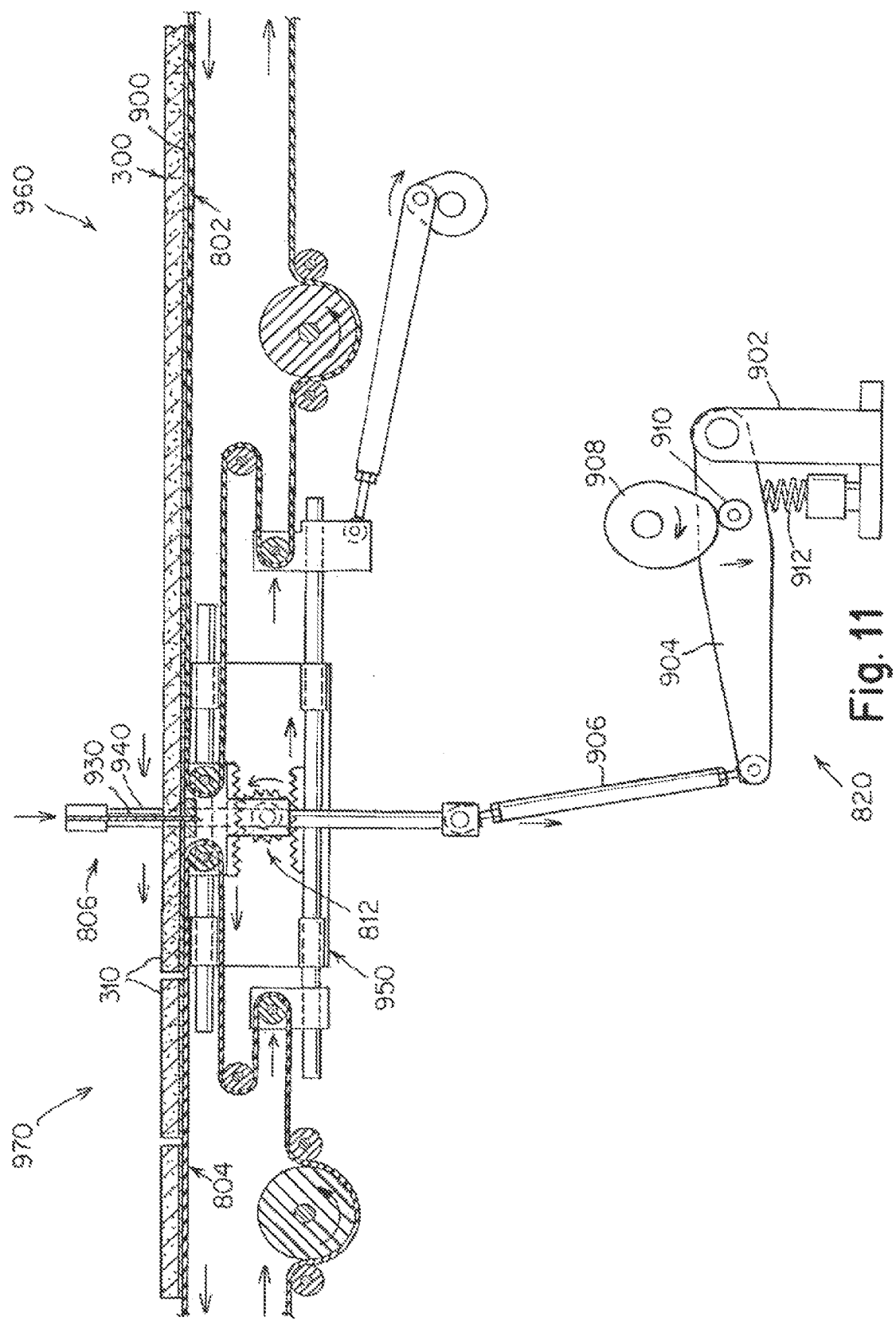

Referring to FIG. 11, as non-circular cam 908 rotates and meshes with follower 910, it causes arm 904, rod 906, and blade 930 and support 940 to all move downwardly so that the blade extends through the die to make a clean cut. As they do, the knife support is moving forward (left) within gearbox 950. Rollers on the input conveyor side 960 are providing slack to allow a distal end (left side) of input conveyor 802 to move to the left, while rollers on output conveyor side 970 are taking up slack as the proximal end (right side) of output conveyor 804 moves to the output side (left).

Referring to FIG. 12, after the cut has been made, the cam causes arm 904, rocker 906, and knife assembly with blade 930 and support 940 to move upwardly, and may allow an accelerated movement leftward to help prevent the blade from sticking to the product. Conveyors 802 and 804 continue to move toward the output end, with rollers coupled to the top and bottom racks and other rollers allowing movement and providing and taking up slack. In FIG. 12, the knife assembly is shown at its leftmost position, where it is about to reverse direction.

Referring to FIG. 13, as the cam 908 continues to turn and mesh with follower 910, arm 904, and rod 908, the knife assembly continues to move upwardly and move to the input side. Here it is shown at about a lateral midpoint in the gearbox. Now, the rollers on input conveyor side 960 are taking up slack while rollers on the output conveyor side are allowing output conveyor to move to the right. Soon, the blade will be back in the position of FIG. 10 and be ready to cut again.

CONCLUSION

In some embodiments, the systems disclosed herein provide a cut product of a single consistent size. In further embodiments, the systems disclosed herein provide cut products of multiple sizes consistently. In some embodiments, the product is cut in specified widths and lengths.

The systems disclosed herein provide a knife that is reciprocated during a cut cycle at about the same speed as a product flow. The cut cycle allows the product feed to keep moving. For ground meat, this system can allow production rates of 150 pieces or more per minute per conveyor line and can improve the accuracy of portioning. Although the feed belts and knife assembly are servo driven for accurate control, the knife is actuated by a profiled cam set that pulls the knife down, and then returned by progressive springs and the same cam, to ensure the knife is fully up on the reset cycle.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. Other embodiments are within the claims, such as cutting different products, or using different materials.

The invention claimed is:

1. An apparatus comprising:
   a first conveyor configured to move along a first direction; and
   a knife assembly configured to provide a reciprocating motion along the first direction;
   wherein the knife assembly includes a blade movable in a second direction perpendicular to the first direction from an upper position spaced in the second direction from the first conveyor to a lower position to provide a cut to a product on the first conveyor,
   wherein the knife assembly is configured to move from a first position to a second position along the first direction while the first conveyor moves in the first direction, and wherein the knife assembly is further configured to move in a reverse direction to return to the first position, and
   wherein the knife assembly is configured to accelerate in the first direction faster than the first conveyor as the blade moves from the lower position to the upper position to provide separation between the blade and the product on the first conveyor, thereby providing a cut product.

2. The apparatus of claim 1, further comprising a rack and pinion coupled to the knife assembly configured to cause the knife assembly to move in the reciprocating motion.

3. The apparatus of claim 2, further comprising a cam coupled to the knife assembly and to the rack and pinion for causing the blade to move between the upper and lower positions.

4. The apparatus of claim 1, wherein the knife assembly is coupled to a cam and to at least one spring for providing motion along the second direction.

5. The apparatus of claim 4, wherein the cam comprises a non-circular cam.

6. The apparatus of claim 5, wherein the cam causes the blade to accelerate in the first direction.

7. The apparatus of claim 6, wherein the cam is coupled to the blade via an arm and a rocker, and the cam is configured to cause the arm and the rocker to move upward to cause the blade to accelerate in the first direction.

8. The apparatus of claim 1, further comprising means, coupled to the blade, for causing the blade to move up and down along the second direction.

9. The apparatus of claim 1, further comprising means, coupled to the knife assembly, for causing the knife assembly to move laterally in a reciprocating manner.

10. The apparatus of claim 1, wherein the knife assembly is configured to accelerate in the first direction faster than the first conveyor immediately after making the cut.

11. The apparatus of claim 1, further comprising a second conveyor, substantially co-planar with the first conveyor, and arranged so that a distal end of the first conveyor is near a proximal end of the second conveyor for moving the product along the first direction.

12. The apparatus of claim 11, wherein the blade is configured to cut through the product conveyed on the first and second conveyor.

13. The apparatus of claim 12, wherein the blade is configured to cut through the product conveyed on the first and second conveyor while the first and second conveyor are moving continually.

14. The apparatus of claim 1, wherein the knife assembly is configured to move at a first speed as the blade moves from the upper position to the lower position.

15. The apparatus of claim 14, wherein the knife assembly is configured to move at a second speed as the blade moves from the lower position to the upper position.

16. The apparatus of claim 14, wherein a time between a first motion of the blade from the upper position to the lower position and a second motion of the blade from the upper position to the lower position is varied to modify a size of the cut product.

17. The apparatus of claim 14, wherein the knife assembly is configured to move at a third speed in the reverse direction to return to the first position.

18. The apparatus of claim 17, wherein the third speed relative to the first speed determines a size of the cut product.

19. The apparatus of claim 1, wherein the knife assembly is configured to move from the first position to the second position at the same speed as the first conveyor.

* * * * *